United States Patent [19]
De La Sierra E.

[11] Patent Number: 5,227,194
[45] Date of Patent: Jul. 13, 1993

[54] REFLECTING VEHICLE LICENSE PLATE AND SIGN AND METHOD OF MAKING SAME

[76] Inventor: Jose L. De La Sierra E., Norte 45 #985, Colonia Industrial Vallejo, 02300 Mexico D.F., Mexico

[21] Appl. No.: 735,925

[22] Filed: Jul. 25, 1991

[30] Foreign Application Priority Data

Jan. 24, 1990 [MX] Mexico ..................................... 19267
Apr. 8, 1991 [MX] Mexico ..................................... 25256

[51] Int. Cl.$^5$ ............................................. B05D 5/06
[52] U.S. Cl. ..................................... 427/162; 40/208; 427/264
[58] Field of Search ................. 156/222, 223; 427/163, 427/264, 162; 40/208, 616

[56] References Cited

U.S. PATENT DOCUMENTS 350,085  6/1931 Rist ........................................ 40/136
3,895,987  7/1975 Loreck ................................. 156/223

Primary Examiner—Michael Lusigan
Attorney, Agent, or Firm—Kerkam, Stowell, Kondracki & Clarke

[57] ABSTRACT

This invention pertains to a procedure for making reflecting plates, having reflective film, to be used for vehicle licenses and identification, whose identification characters are raised or depressed and then blocked with a paint or substance, using rollers to prevent them from being painted when the entire background or front of said plate, which is opaque, translucent or less reflective than the identification characters on said plate, is painted, and the product resulting from said process.

3 Claims, 3 Drawing Sheets

REFLECTING VEHICLE LICENSE PLATE AND SIGN AND METHOD OF MAKING SAME

BRIEF SUMMARY OF THE INVENTION

This invention relates to plates having a reflective film to be used for vehicle licenses and identification and for reflecting signs, in general, and to procedures for making such plates on which identification characters are raised or depressed, and the background of which may be nonreflective or less reflective of light than the identification characters, and to methods of making same.

One aspect of the invention is a manufacturing process which makes its possible to make license plates and identification plates which are reflective and have backgrounds which are less reflective than the identification characters on the sign, thereby making the plate more legible, and thereby providing a plate which is less difficult to read at night. In order to make the plates easier to read when subjected to a light beam, the identification characters are either raised above the background or depressed from the background.

BRIEF DESCRIPTION OF THE DRAWINGS

The invention will be more particularly described in reference to the accompanying drawings wherein.

DETAILED DESCRIPTION OF THE INVENTION

Figure 1:
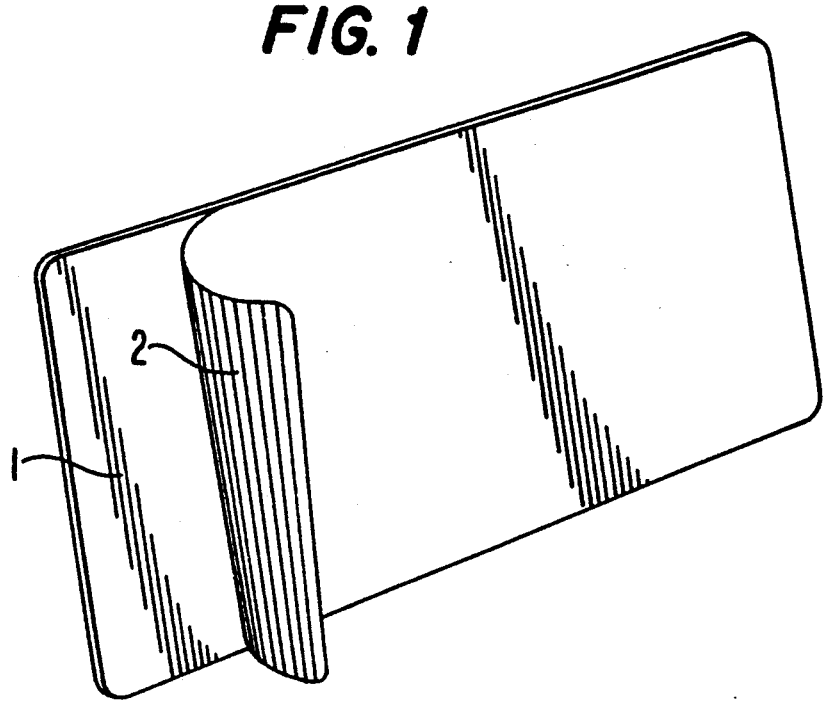
FIG. 1 is a perspective view of a first step in producing the reflective signs of the invention.

One process for manufacturing plates of the invention begins with the bonding of a reflective film to sheeting 2 which forms the plate, as illustrated in FIG. 1.

Figure 2:
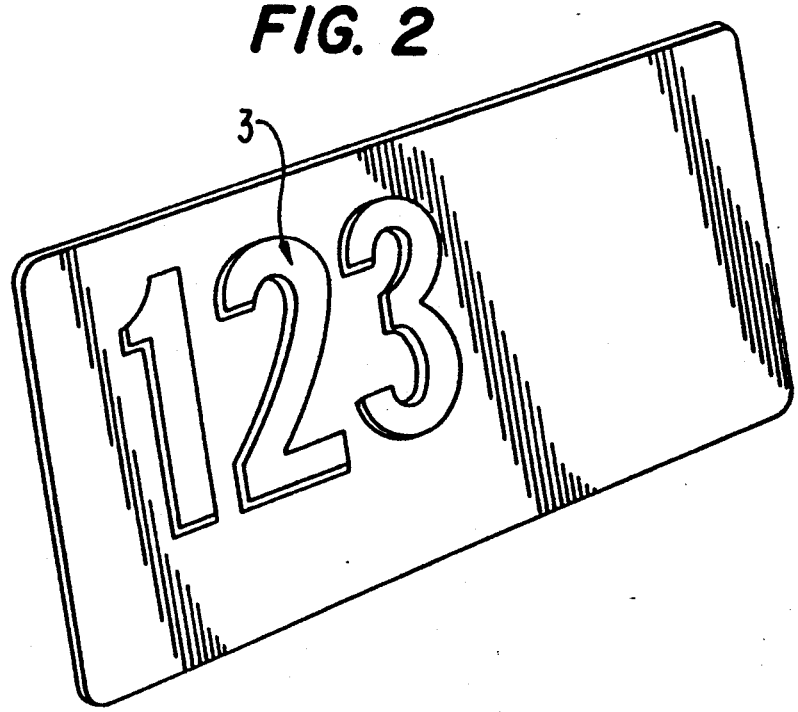
FIG. 2 illustrates a second step in producing the plates of the invention.
Figure 3:
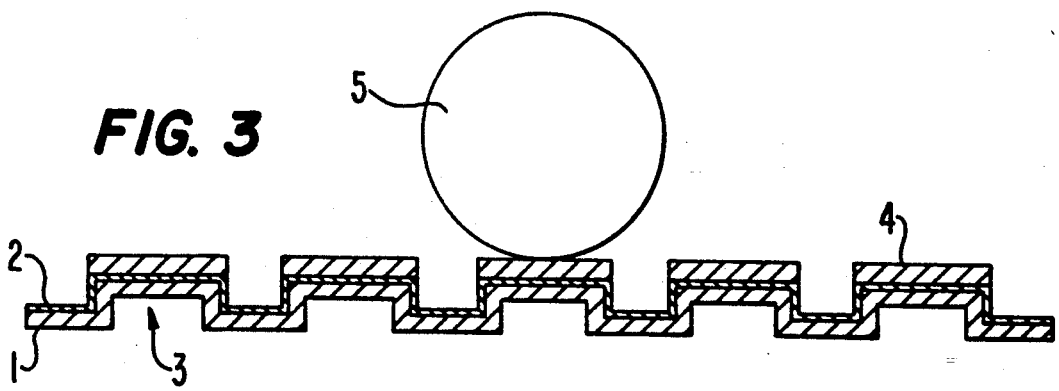
FIG. 3 is a sectional view through a further step in the production of novel plates.

The assembly or bonding forms a single unit, and the unit is then stamped and the raised identification characters are toward the front, as illustrated in FIG. 2, wherein said raised or imprinted characters are labelled 3. A temporary paint or blocking material is subsequently applied to the characters using paint application rollers 5, or the like. Because the characters 3 are higher than the background of the plate, only the characters are painted, as illustrated in FIG. 3.

The entire plate is subsequently painted by spraying, or using any other method, with the paint which will form the final background color of the plate.

Figure 4:
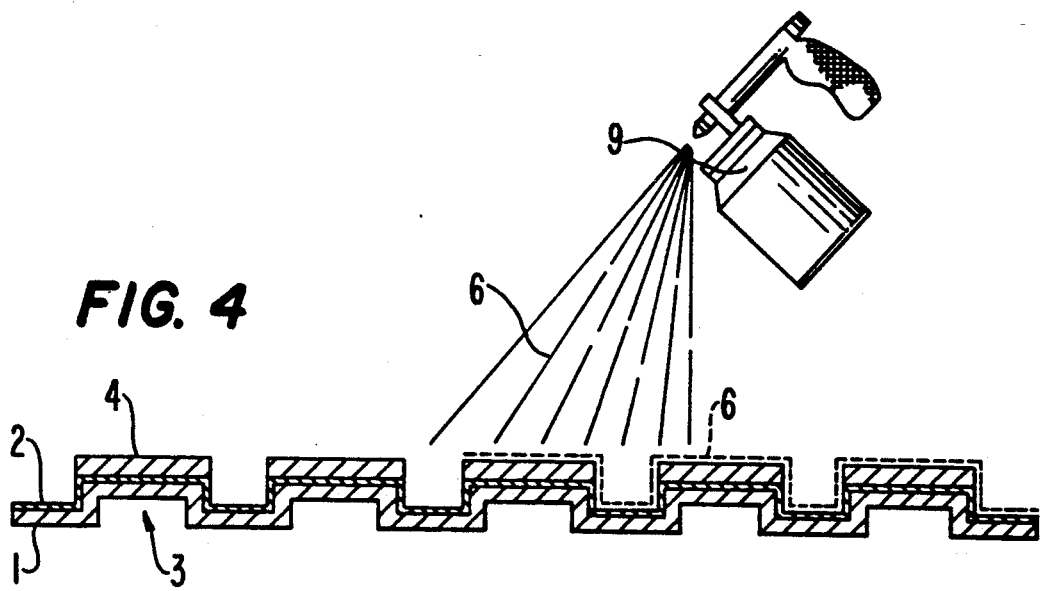
FIG. 4 is a view like FIG. 3 showing a further step in plate production.

As illustrated in FIG. 4, the paint to block the characters is labelled 6; 9 designates the paint-spraying equipment for painting the entire plate; number 6 in FIG. 4 designates the permanent paint on the background of the plate. This paint 6 adheres permanently to the entire plate, except where paint or blocking substance 4 is present.

Figure 5:
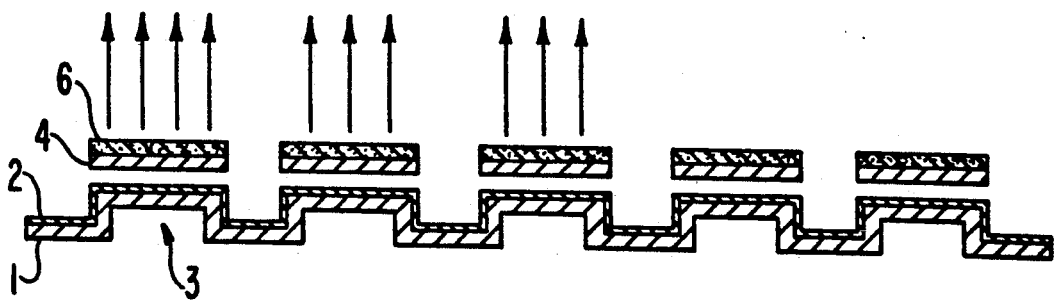
FIG. 5 is a view like FIGS. 3 and 4 illustrating a final step in plate production.
Figure 6:
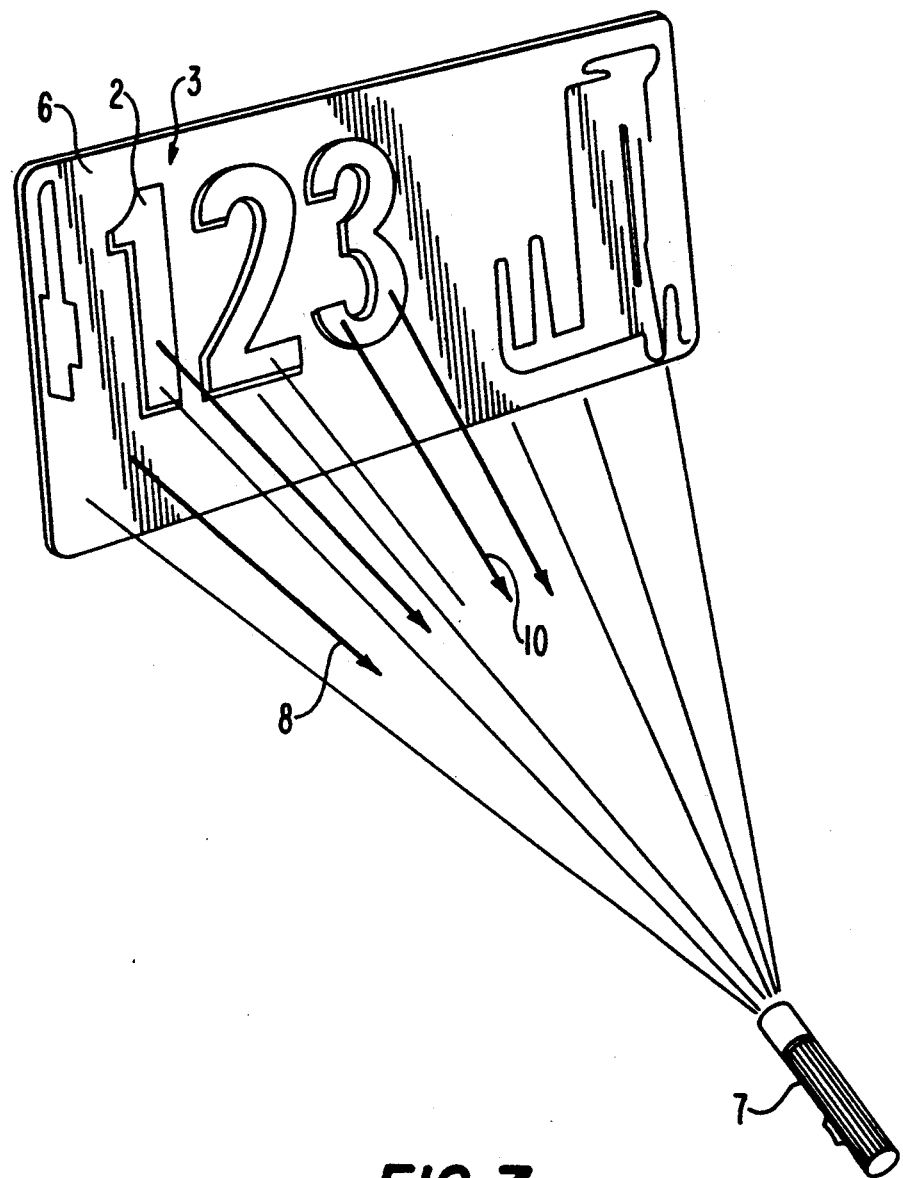
FIG. 6 is a schematic view of a finished license plate constructed in accordance with the teachings of the invention.

Because the permanent paint 6 adheres very poorly to the characters, it is removed easily, as shown in FIG. 5, wherein 4 and 6 designate the complex of permanent paint and temporary paint which is removed from the characters, leaving them with the initial reflective characteristics of the reflective film 2, while the permanent paint 6 stays on the body or background, making it less reflective, thus producing the desired effect, i.e., the characters on the plate will be more legible, because they produced a contrast, and when light hits the plate, as shown in FIG. 6, wherein number 7 designates the light source, 8 designates reflection from the body or background of the plate which is less reflective than the characters 3 having greater reflection 10, eliminating the dazzling effect of conventional plates on which the background is more reflective than the characters.

Figure 7:
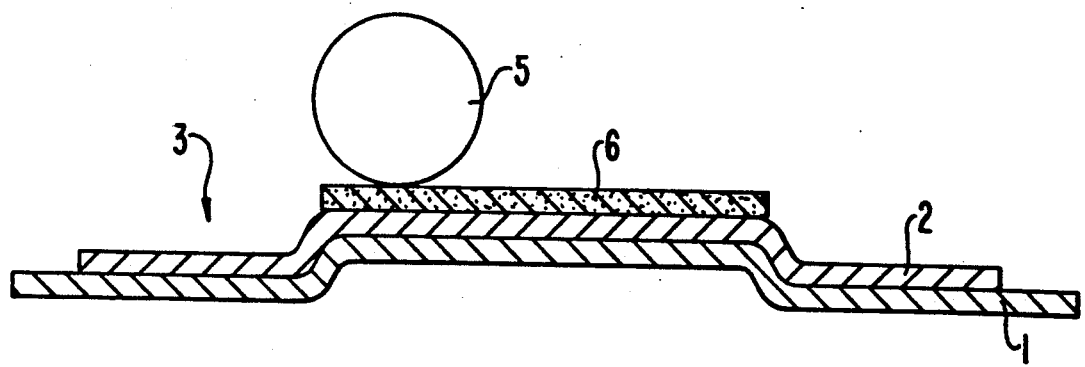
FIG. 7 is a cross-sectional view of another aspect of the invention.

Referring now to FIG. 7, in this aspect of the invention which pertains to a manufacturing process for making a reflective plate having a less reflective or dark base and reflecting or light characters 3:

The characters are depressed downward of the plate 1.

Known processes for making reflective plates used on automobiles, trucks, vehicles in general, streets and roads wherein after the reflective film is bonded to the sheeting, the characters are first imprinted, and then are painted using rollers with a color other than that of the adhesive reflective film. This makes it possible to produce plates of two or more colors.

The problem arises when the goal is to produce a plate having a dark background and light characters, i.e., in which the characters, rather than the body of the plate, are reflective to make the characters more visible when struck by a light beam.

In this case, the characters are imprinted downward, and the surface is painted (see FIG. 7). FIG. 7 shows a lateral view wherein 1 designates the plate itself. In the same figure, the adhesive reflecting film is labelled 2 and the roller 5, with paint different from the film, or dark paint, which will cover the entire surface not impressed downward, labelled 6.

In FIG. 7, the downwardly-imprinted character is labelled 3. Said character, number, letter, or figure remains unpainted and, thus, when a light beam is emitted, it reflects the beam back.

I claim:

1. The method of making a reflective plate or sign, the steps comprising: applying to a surface of a plate, which is intended to be the front of the plate, a light-reflecting film to form a composite, depressing, from the surface intended to be the front of the plate, characters in said composite; applying a removable coating on said depressed characters; coating the entire composite with a permanent paint and removing the removable coating and paint from the depressed characters, so that when the characters are viewed from the front, the characters retain their original reflective characteristics.

2. The method of making a reflective plate or sign, the steps comprising: applying to a surface of a plate, which is intended to be the front of the plate, a light-reflecting film to form a composite, forming characters in said composite; applying a removable coating on said formed characters; coating the entire composite with a permanent paint and removing the removable coating and paint from the formed characters; where, when the plate is viewed from the front, the characters retain their original reflective characteristics.

3. The method for making reflective plates or signals comprising the sequential steps:
   (a) bonding a reflective film to a face intended to be the front of the plate;
   (b) imprinting the plate which characters raised toward the front of the plate;
   (c) roller painting the raised characters with a paint-type substance which covers, but does not permanently adhere to, the characters;
   (d) painting the entire plate with a paint less reflective than the reflective film; and
   (e) separating or removing the paint from the characters, whereby the characters, when viewed from the front, retain the original characteristics of the reflective film, and the rest of the plate is less reflective, thus producing a contrast which makes the identification characters on said plate more legible.

* * * * *

UNITED STATES PATENT AND TRADEMARK OFFICE
CERTIFICATE OF CORRECTION

PATENT NO.   :   5,227,194

DATED        :   July 13, 1993

INVENTOR(S)  :   De La Sierra E.

It is certified that error appears in the above-identified patent and that said Letters Patent is hereby corrected as shown below:

Column 3, Line 1 of Claim 3, "signals" should be -- signs --.

Signed and Sealed this

First Day of February, 1994

*Attest:*

BRUCE LEHMAN

*Attesting Officer*  Commissioner of Patents and Trademarks